(12) United States Patent
Su et al.

(10) Patent No.: US 10,061,851 B1
(45) Date of Patent: Aug. 28, 2018

(54) ENCOURAGING INLINE PERSON-TO-PERSON INTERACTION

(71) Applicant: Google LLC, Mountain View, CA (US)

(72) Inventors: Sara Su, San Jose, CA (US); Subramaniam Ganapathy, Mountain View, CA (US); Jin Zhou, Palo Alto, CA (US); Sean Liu, El Dorado Hills, CA (US); Saksiri Tanphaichitr, Mountain View, CA (US); Abigail Jones, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 65 days.

(21) Appl. No.: 13/795,028

(22) Filed: Mar. 12, 2013

(51) Int. Cl.
*G06F 17/30* (2006.01)

(52) U.S. Cl.
CPC .............................. *G06F 17/30864* (2013.01)

(58) Field of Classification Search
None
See application file for complete search history.

(56) References Cited

U.S. PATENT DOCUMENTS

| | | | |
|---|---|---|---|
| 8,407,285 B2 * | 3/2013 | Cheah | 709/203 |
| 8,892,591 B1 * | 11/2014 | Haugen | G06F 17/30 707/723 |
| 2002/0143961 A1 * | 10/2002 | Siegel | G06F 21/6245 709/229 |
| 2004/0167813 A1 * | 8/2004 | Robertson et al. | 705/8 |
| 2007/0198944 A1 * | 8/2007 | Viswanathan et al. | 715/778 |
| 2009/0070684 A1 * | 3/2009 | Aldrich et al. | 715/743 |
| 2009/0138906 A1 * | 5/2009 | Eide | G06F 17/30038 725/32 |
| 2009/0327268 A1 * | 12/2009 | Denney | G06F 17/30053 |
| 2010/0198837 A1 * | 8/2010 | Wu | G06F 17/30672 707/748 |
| 2010/0274775 A1 * | 10/2010 | Fontes et al. | G06F 17/30991 707/706 |
| 2011/0302500 A1 * | 12/2011 | Tsuei | 715/739 |
| 2011/0314048 A1 * | 12/2011 | Ickman | G06Q 10/107 707/769 |
| 2012/0030193 A1 * | 2/2012 | Richberg | G06Q 10/10 707/719 |

(Continued)

*Primary Examiner* — Taghi T Arani
*Assistant Examiner* — F J Farhadian
(74) *Attorney, Agent, or Firm* — Fish & Richardson P.C.

(57) ABSTRACT

Methods, systems, and apparatus, including computer programs encoded on a computer storage medium, for receiving a search query from a searching user, receiving contact data associated with a user that is determined to be responsive to the search query, the contact data being provided from one or more data sources, and providing an electronic document including instructions to display a search results page including search results responsive to the search query and a profile card associated with the user, the profile card including one or more graphical representations associated with an interaction channel, each interaction channel being associated with respective contact data of the contact data, and each graphical representation being operable to receive user input and initiate execution of an associated interaction from the search results page, an interaction interface used to execute the associated interaction being displayed concurrently with the search results page.

13 Claims, 5 Drawing Sheets

(56) References Cited

U.S. PATENT DOCUMENTS

| | | | |
|---|---|---|---|
| 2012/0059838 A1* | 3/2012 | Berntson | G06F 17/30864 707/759 |
| 2012/0089601 A1* | 4/2012 | Bailey et al. | G06F 17/30864 707/723 |
| 2012/0198348 A1* | 8/2012 | Park | 715/739 |
| 2013/0097529 A1* | 4/2013 | Postoaca | G06Q 50/01 715/753 |
| 2013/0110825 A1* | 5/2013 | Henry | G06F 17/3053 707/723 |
| 2013/0132378 A1* | 5/2013 | Gilad-Bachrach | G06F 17/30867 707/723 |
| 2013/0173569 A1* | 7/2013 | Pearcy | G06F 17/30 707/706 |
| 2013/0205235 A1* | 8/2013 | Gabara | G06F 17/30867 715/763 |
| 2013/0212099 A1* | 8/2013 | Dellinger | G06F 17/3064 707/731 |
| 2014/0156634 A1* | 6/2014 | Buchmann | G06F 17/30 707/714 |
| 2014/0214840 A1* | 7/2014 | Gupta | G06F 17/30 707/738 |
| 2014/0304260 A1* | 10/2014 | Ulm | G06F 17/30286 707/728 |

* cited by examiner

ENCOURAGING INLINE PERSON-TO-PERSON INTERACTION

BACKGROUND

This specification relates to presenting data with search results.

The Internet provides access to a wide variety of resources, such as image files, audio files, video files, and web pages. A search system can identify resources in response to queries submitted by users and provide information about the resources in a manner that is useful to the users. The users then navigate through (e.g., click on) the search results to acquire information of interest to the users.

Users of search systems are often searching for information regarding a specific entity. For example, users may want to learn about a singer that they just heard on the radio. Conventionally, the user would initiate a search for the singer and select from a list of search results determined to be relevant to the singer.

SUMMARY

Implementations of the present disclosure are generally directed to enabling person-to-person contact based on information provided in a search results page. More particularly, implementations of the present disclosure include surfacing contact information within a search results page and enabling initiation of an interaction between users from the search results page based on user selection of the contact information.

In general, innovative aspects of the subject matter described in this specification can be embodied in methods that include actions of receiving a search query from a searching user, receiving contact data associated with a user that is determined to be responsive to the search query, the contact data being provided from one or more data sources, providing an electronic document including instructions that, when executed by a computing device, cause the computing device to display a search results page including search results responsive to the search query and a profile card associated with the user, the profile card including one or more graphical representations associated with an interaction channel, each interaction channel being associated with respective contact data of the contact data, and each graphical representation being operable to receive user input and initiate execution of an associated interaction from the search results page, an interaction interface used to execute the associated interaction being displayed concurrently with the search results page, and transmitting the electronic document to a computing device associated with the searching user. Other implementations of this aspect include corresponding systems, apparatus, and computer programs, configured to perform the actions of the methods, encoded on computer storage devices.

These and other implementations can each optionally include one or more of the following features: the user is determined to be responsive to the search query in response to determining that information associated with the user is responsive to the search query; the contact data includes one or more of an electronic message address, a chat identification, a video identification and a telephone number; the contact data includes publicly available contact data; actions further include determining that a portion of the contact data is accessible to the searching user based on privacy settings provided by the user, the portion of the contact data being included in the contact data in response to determining that a portion of the contact data is accessible to the searching user; the one or more data sources include at least one of a contact data repository associated with a computer-implemented contact management service, a social data repository associated with a computer-implemented social networking service, an electronic mail address repository associated with a computer-implemented electronic mail service, and a public data repository; interactions include a telephone call, an electronic mail, a chat session and a video conference; and an interaction hovercard is displayed with the search results page in response to initiating execution of an interaction from the search results page, the interaction hovercard providing an interface for the searching user to conduct the interaction.

Particular implementations of the subject matter described in this specification can be implemented so as to realize one or more of the following advantages. In some examples, a user interface provides a snapshot of contact data available about a user collated from multiple sources. Example sources can include electronic mail, contact management and/or social networking services. In some examples, the snapshot can be quickly scanned by a searching user without needing to leave the search results page. In some examples, by collating multiple data sources, duplicated or otherwise redundant information can be culled before the snapshot is displayed to the user. In some examples, the user interface provides entry points to start communication services (e.g., electronic mail, voice chat, video chat, and/or social networking services) without the searching user needing to leave the search results page. In some examples, data displayed in the snapshot is personalized and access-controlled. In some examples, the display of data respects privacy settings on the data and references social connections between the searching user and the user being displayed.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
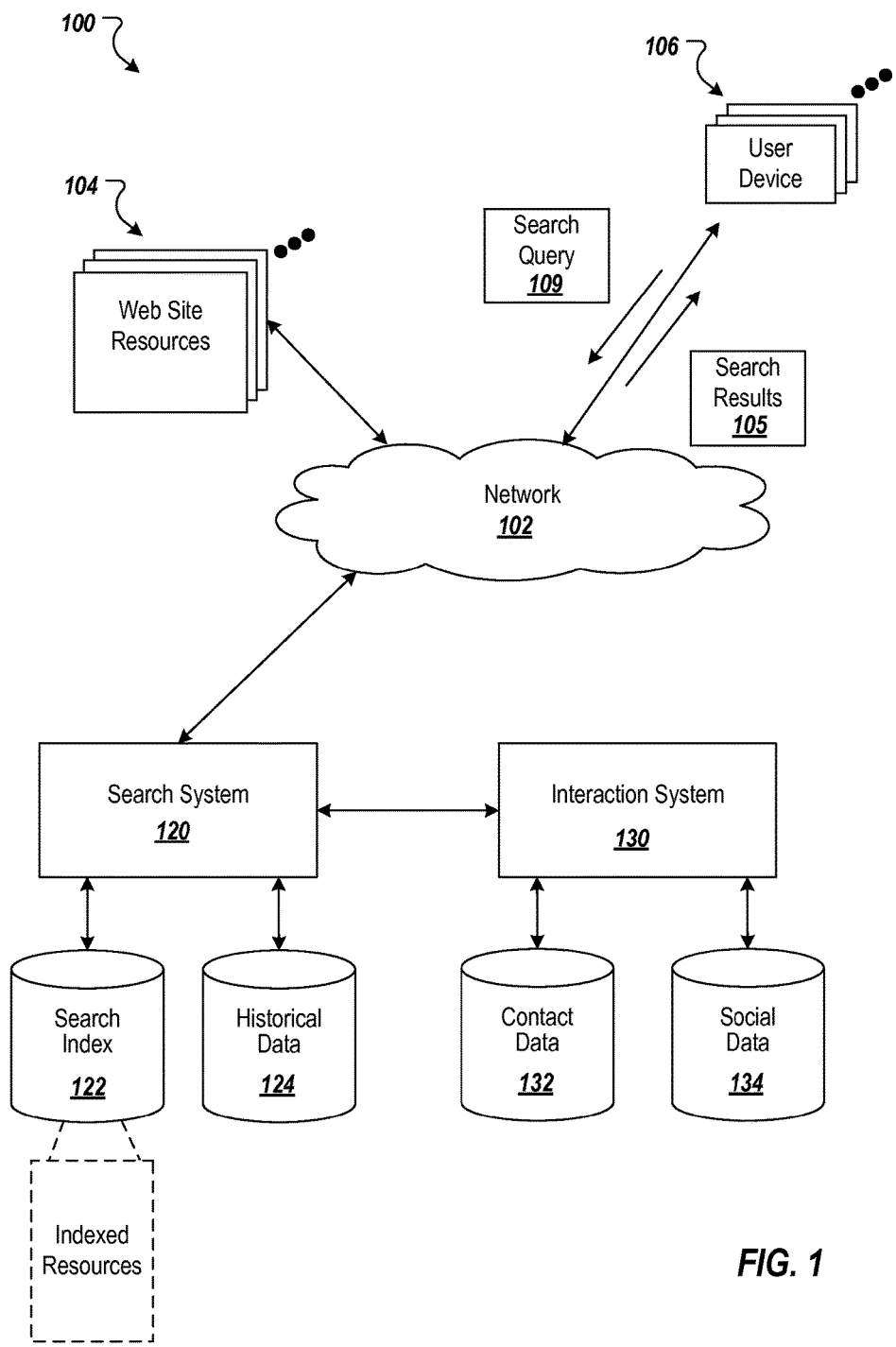
FIG. 1 depicts an example environment in which a search system provides search services.

FIG. 1 is a block diagram of an example environment 100 in which a search system 120 provides search services. The example environment 100 includes a network 102 that connects resources 104, user devices 106, and the search system 120 for communication therebetween. Example resources can include web sites. In some examples, the network 102 includes a local area network (LAN), wide area network (WAN), the Internet, telephone networks, e.g., public switched telephone network (PSTN) and/or cellular network, or any appropriate combination thereof.

In some examples, a user device 106 is an electronic device that is under control of a user and is capable of requesting and receiving resources 104 over the network 102. In some examples, user devices 106 can include a mobile phone, a smartphone, a personal digital assistant (PDA), a laptop computer, a desktop computer, a tablet, and any appropriate combinations thereof. As used throughout this document the term mobile computing device ("mobile device") refers to a user device that is configured to communicate over a mobile communications network. A smartphone, (i.e., a phone that is enabled to communicate over the Internet) is an example of a mobile device. A user device 106 typically includes a user application, e.g., a web browser, to facilitate the sending and receiving of data over the network 102.

In some examples, the network 102 can be accessed over a wired and/or a wireless communications link. In some examples, computing devices, e.g., smartphones, can utilize a cellular network to access the network 102. For example, communication can be provided under various modes or protocols. Example protocols can include SMS, EMS or MMS messaging, GSM, TCP, UDP, RTP, VoIP, FDMA, CDMA, TDMA, PDC, WCDMA, CDMA2000, TD-SCDMA and/or GPRS. Such communication may occur, for example, through a radio-frequency transceiver (not shown). In some examples, user devices 106 can be capable of short-range communication using features including, but not limited to, Bluetooth and/or WiFi transceivers.

In some examples, a web site is provided as one or more resources 104 associated with a domain name and hosted by one or more servers. An example web site is a collection of web pages formatted in hypertext markup language (HTML) that can contain text, images, multimedia content, and programming elements, e.g., scripts. Each web site is maintained by a publisher, e.g., an entity that manages and/or owns the web site.

In some examples, a resource 104 is data provided over the network 102 and that is associated with a resource address, e.g., a uniform resource locator (URL). Resources 104 that can be provided can include HTML pages, word processing documents, and portable document format (PDF) documents, images, video, and feed sources, to name just a few. The resources 104 can include content, e.g., words, phrases, images and sounds and may include embedded information, e.g., meta information and hyperlinks, and/or embedded instructions, e.g., scripts.

In some examples, and to facilitate searching of resources 104, the search system 120 identifies the resources 104 by crawling and indexing the resources 104 provided on web sites, for example. Data about the resources 104 can be indexed based on the resource to which the data corresponds. The indexed and, optionally, cached copies of the resources 104 are stored in a search index 122.

In some examples, the user devices 106 submit search queries 109 to the search system 120. In response, the search system 120 accesses the search index 122 to identify resources 104 that are relevant to, e.g., have at least a minimum specified relevance score for, the search query 109. The search system 120 identifies relevant resources 104, generates search results 111 that identify the resources 104, and returns the search results 111 to the user devices 106. In some examples, a search results page 105 is data generated by the search system 120 that identifies a resource 104 that is responsive to a particular search query, and includes a link to the resource 104. An example search results page 105 can include search results represented as a web page title, a snippet of text or a portion of an image extracted from the web page, and the URL of the web page.

Data for the search queries 109 submitted during user sessions are stored in a data store, such as the historical data store 124. For example, the search system 110 can store received search queries in the historical data store 124.

Selection data specifying actions taken in response to search results provided in response to each search query 109 are also stored in the historical data store 124, for example, by the search system 120. These actions can include whether a search result was selected, e.g., clicked or hovered over with a pointer. The selection data can also include, for each selection of a search result, data identifying the search query 109 for which the search result was provided.

In accordance with implementations of the present disclosure, the search system 120 can receive information from an interaction system 130 to provide user profile information in the search results page 105. In some examples, the interaction system 130 can identify one or more users that are determined to be responsive to the search query 109. In this manner, the one or more users and/or resources associated with the one or more users can be surfaced in the search results page 105. For example, a searching user can submit a search query for "music," e.g., the search query 109, and the search results page 105 can include websites associated with musicians, e.g., users, as well as user profiles for one or more of the users. As another example, a searching user can submit a search query for a concert event, and the search results page 105 can include user profile information of users, e.g., contacts or friends, who have recently posted about that event and/or who attended the event.

In some implementations, the interaction system 130 can retrieve contact information associated with each user and can provide the contact information in the search results page 105. In some examples, contact information associated with a user can be retrieved from one or more data sources. In FIG. 1, example data sources include a contact data repository 132 and a social data repository 134. Further data sources in addition to, or in replace of the contact data repository 132 and/or the social data repository 134 can be implemented in accordance with the present disclosure.

In some examples, the data sources can be provided as part of one or more computer-implemented services. Example computer-implemented services can include an electronic mail service, a chat service, a contact management service, a social networking service, a blogging service and a micro-blogging service. For example, the contact data repository 132 can store contact data that is managed by a contact management service. For example, a user can use the contact management service to store contact information associated with one or more contacts. As another example, the social data repository 134 can store contact data that is provided within a social networking service. For example, a user that interacts with the social networking service can establish a profile that can include contact information. Example contact information can include name, address, telephone number(s), online ID(s), and/or electronic mail address(es).

In some implementations, a data source can include public information associated with users. In some examples, public information can include contact data that is publicly available over the Internet. For example, a user can be a blogger and can provide contact information, e.g., electronic mail address, telephone number, online ID, on a publicly viewable blog page. As another example, a user can establish a profile associated with one or more computer-implemented services, e.g., a social networking service, and can provide publicly available contact data, e.g., electronic mail address, telephone number, online ID, based on privacy settings. For example, the user can use privacy settings to indicate whether contact data is to be publicly available.

In some implementations, the search system 120 and/or the interaction system 130 can generate a profile card associated with a user, to display the profile card within the search results page 105. In some examples, and as discussed in further detail herein, the profile card can include contact data that is provided from one or more data sources, e.g., the contact data repository 132, the social data repository 134, and/or a public information repository.

Implementations of the present disclosure are generally directed to enabling interaction between users. More particularly, implementations of the present disclosure are directed to providing interaction channels with search results to enable and to encourage interactions between users directly from a search results page. Example interactions can include sending an electronic mail, placing a telephone call, conducting a chat session, sending a text message, and conducting a video conference. In some implementations, a profile card associated with a user can be displayed in search results in response to a query submitted by a searching user. In some examples, the profile card includes one or more interaction elements, each interaction element being associated with an interaction channel, through which an interaction between the searching user and a user associated with the profile card.

In some implementations, contact data for the user can be received from one or more data sources, e.g., the contact data repository 132, the social data repository 134 of FIG. 1, and/or a public information repository. In some examples, the type and number of interaction elements displayed is based on contact data that is available for the user associated with the profile card. For example, if the contact data only includes an electronic mail address, an interaction element corresponding to the electronic mail address is provided. As another example, if the contact data includes an electronic mail address and a telephone number, interaction elements respectively corresponding to the electronic mail address and the telephone number are provided.

In some implementations, the type and number of interaction elements displayed is based on the contact data that is available to the searching user. For example, if contact information is available for a user, but the contact information is not public, or is otherwise not made available to the searching user, an interaction element for the contact data is not provided. For example, the searching user can include the user as a contact using a contact management service and can have the user's work telephone number and work electronic mail address recorded in a contact record. The user can have a profile established within a computer-implemented service, e.g., a social networking service, that includes a mobile telephone number and a personal electronic mail address. The user, however, can set privacy setting, such that the mobile telephone number and the personal electronic mail address are not available to the searching user. Consequently, a profile card associated with the user that is to be displayed within search results to the searching user can include interaction elements corresponding to work telephone number and work electronic mail address, but is absent of the mobile telephone number and the personal electronic mail address.

In some implementations, it can be determined that a plurality of users are responsive to the query submitted by the searching user. For example, the user can submit the search query "John Doe," and a plurality of users having the name "John Doe" can be determined to be responsive to the query. In some examples, a plurality of profile cards can be provided, each profile card being associated with a "John Doe" of the plurality of users having the name "John Doe."

In some implementations, profile cards for a sub-set of the plurality of users can be displayed. In some examples, the sub-set includes one or more users of the plurality of users. For example, it can be determined that a particular user "John Doe" of the plurality of users "John Doe" is associated with the searching user. For example, a contact record for "John Doe" can be provided in a contact management service used by the searching user. As another example, the searching user and "John Doe" can be connected within a computer-implemented service, e.g., socially connected within a social networking service. Consequently, a profile card can be provided for the particular user "John Doe" of the multiple users "John Doe," instead of profile cards for each "John Doe" that would be responsive to the query.

As another example, it can be determined that multiple users "John Doe" of the plurality of users "John Doe" is associated with the searching user. For example, a contact record for "John Doe" can be provided in a contact management service used by the searching user, and the searching user and another "John Doe" can be connected within a computer-implemented service, e.g., socially connected within a social networking service. Consequently, profile cards can be provided for the both users "John Doe" of the multiple users "John Doe."

As another example, it can be determined that a user "John Doe" of the plurality of users "John Doe" is associated with the searching user, and that another user "John Doe" is a well-known user, e.g., a celebrity, a blogger, an athlete. For example, a contact record for a first user "John Doe" can be provided in a contact management service used by the searching user, and/or the searching user and the first user "John Doe" can be connected within a computer-implemented service, e.g., socially connected within a social networking service. It can also be determined that a second user "John Doe" is a well-known user, but is not otherwise associated with the searching user. Consequently, profile cards can be provided for the both the first user "John Doe" and the second user "John Doe," the profile card associated with the first user "John Doe" providing contact information that is publicly and/or privately accessible to the searching user, and the profile card associated with the second user "John Doe" providing contact information that is publicly available. In some examples, the profile card associated with the first user "John Doe" can be displayed more prominently than the profile card associated with the second user "John Doe." In some examples, the profile card associated with the second user "John Doe" can be displayed more prominently than the profile card associated with the first user "John Doe."

In some implementations, the searching user can log into the search system. For example, the searching user can provide credentials, e.g., username and password. In this manner, the search system can tailor search results and/or profile cards based on an identity of the searching user. For example, the searching system can log into the search system and can submit a search query. The search system can provide search results responsive to the search query and one or more profile cards responsive to the search query. In some examples, a profile card can be associated with a user that is connected to the searching user through one or more computer-implemented services. For example, the user can be considered connected to the searching user, because the searching user has stored a contact record associated with the user within a contact management service. As another example, the user and the searching user can be contacts of one another within a social networking service. Because the searching user is logged into the search service, connections between the user and the searching user can be determined.

As discussed in further detail herein, the contact data associated with a user can be accessible through the profile card displayed to the searching user, such that the searching user can initiate an interaction with the user from the profile card. In some examples, the searching user can select, e.g., click on, displayed contact data and, in response to the user selection, an interaction is initiated using an associated interaction channel. For example, the searching user can select a telephone number and, in response, a text messaging interaction or a telephone call can be prompted. As another example, the searching user can select an electronic mail address and, in response, an electronic mail interaction can be prompted. Other example interactions can include a chat session and a video conferencing session.

In some implementations, and as noted above, a text messaging interaction or a telephone call can be prompted in response to selection of a telephone number. In some examples, the searching user can be using a computing device that does not include telephone capabilities, e.g., a laptop computer, a desktop computer, a tablet. Consequently, the telephone call can be provided using an appropriate protocol, e.g., VoIP. In some examples, a microphone and a speaker of the computing device can be used to enable audible communication between the searching user and the user that was called. In some examples, the searching user can be using a computing device that includes telephone capabilities, e.g., a smartphone. Consequently, the telephone call can be provided using an appropriate protocol or combination of protocols, e.g., GSM, TCP, UDP, RTP, VoIP, FDMA, CDMA, TDMA, PDC, WCDMA, CDMA2000, TD-SCDMA and/or GPRS.

In some examples, the user that is being called can be using a computing device that does not include telephone capabilities, e.g., a laptop computer, a desktop computer, a tablet. Consequently, the telephone call can be provided using an appropriate protocol, e.g., VoIP. In some examples, a microphone and a speaker of the computing device can be used to enable audible communication between the searching user and the user that was called. In some examples, the user that is being called can be using a computing device that includes telephone capabilities, e.g., a smartphone. Consequently, the telephone call can be provided using an appropriate protocol or combination of protocols, e.g., GSM, TCP, UDP, RTP, VoIP, FDMA, CDMA, TDMA, PDC, WCDMA, CDMA2000, TD-SCDMA and/or GPRS.

In accordance with implementations of the present disclosure, interactions can be initiated directly from the search results page and can be provided using an interaction hovercard that is displayed within the search results page. In some examples, an interaction hovercard provides an interface for the searching user to conduct the interaction. In some examples, the interaction hovercard is provided as an overlay to the search results page. In some examples, the interaction hovercard has the appearance of hovering over the search results page. In some examples, the interaction hovercard can be embedded within the search results page.

In some implementations, and in response to the searching user selecting contact data, computer program code, e.g., Javascript, is processed to display the interaction hovercard. In some examples, the interaction hovercard is provided as a widget that is loaded based on processing of the computer program code. In some examples, the widget is provided as a user interface element (e.g., a button or dropdown menu) that is responsive to user input. In some examples, user interaction with a widget (e.g., a click on a button widget) can result in a change in the widget's appearance and/or the display of a new user interface element.

Figure 2A:
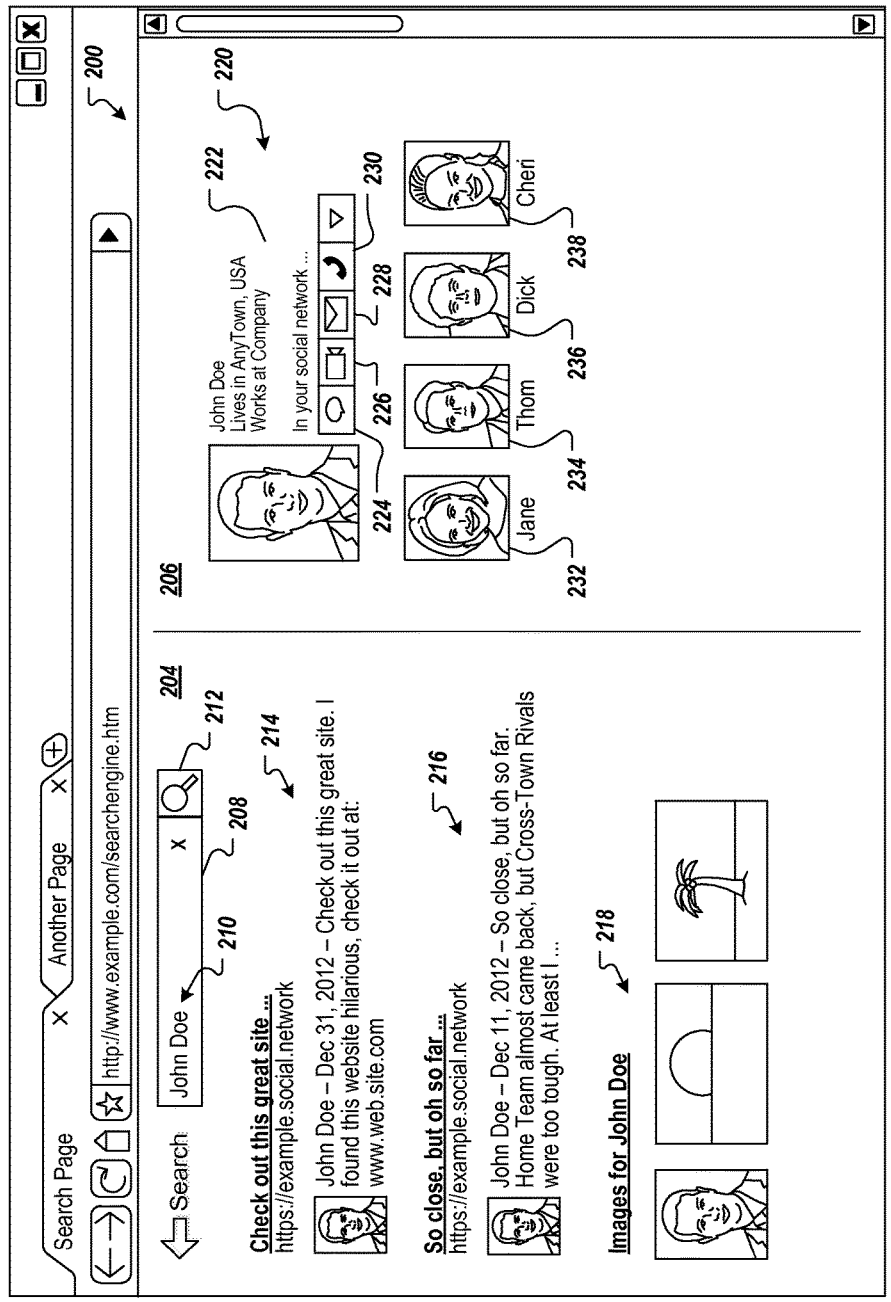
FIG. 2A depicts an example search results page including a profile card.

FIG. 2A depicts an example search results page 200 including a profile card 202. In the depicted example, the search results page 200 is displayed within an example browser window that can be provided by a web browser executed using a computing device. The search results page 200 includes a search results portion 204 and a profile card portion 206. In some examples, the search results portion 204 includes a search box 208, into which search queries can be entered. In the depicted example, an example search query 210 is provided an includes "John Doe." In some examples, a user, e.g., a searching user that entered the search query 210, can initiate a search based on the search query 210 by clicking on a search button 212. A search can be performed based on the search query 210, e.g., as discussed above with reference to FIG. 1, and search results 214, 216, 218 can be displayed in the search results portion 204. The search results 214, 216, 218 are determined to be responsive to the search query 210, and are hence provided in the search results portion 204.

In accordance with implementations of the present disclosure, one or more profile cards can be displayed in the profile card portion 206. In some examples, one or more users can be determined based on a submitted search query and respective profile cards can be generated and displayed in the profile card portion. In the depicted example, a user "John Doe" is determined in response to the search query 210, and a profile card 220 is displayed in the profile card portion 206. The profile card 220 provides summary information 222 associated with the user and provides one or more interaction elements 224, 226, 228, 230. In some examples, profile data associated with one or more other users can be displayed in the profile card portion 206. In the depicted example, thumbnail images 232, 234, 236, 238 associated with respective users are displayed.

In some examples, each interaction element 224, 226, 228, 230 is associated with a respective interaction channel. In the depicted example, the interaction element 224 is associated with a chat channel, the interaction element 226 is associated with a video conferencing channel, the interaction element 228 is associated with an electronic mail channel and the interaction element 230 is associated with a telephony channel. In some examples, and as discussed herein, the number and type of interaction elements provided in the profile card are provided based on contact data that is available for the user associated with the contact card.

Figure 2B:
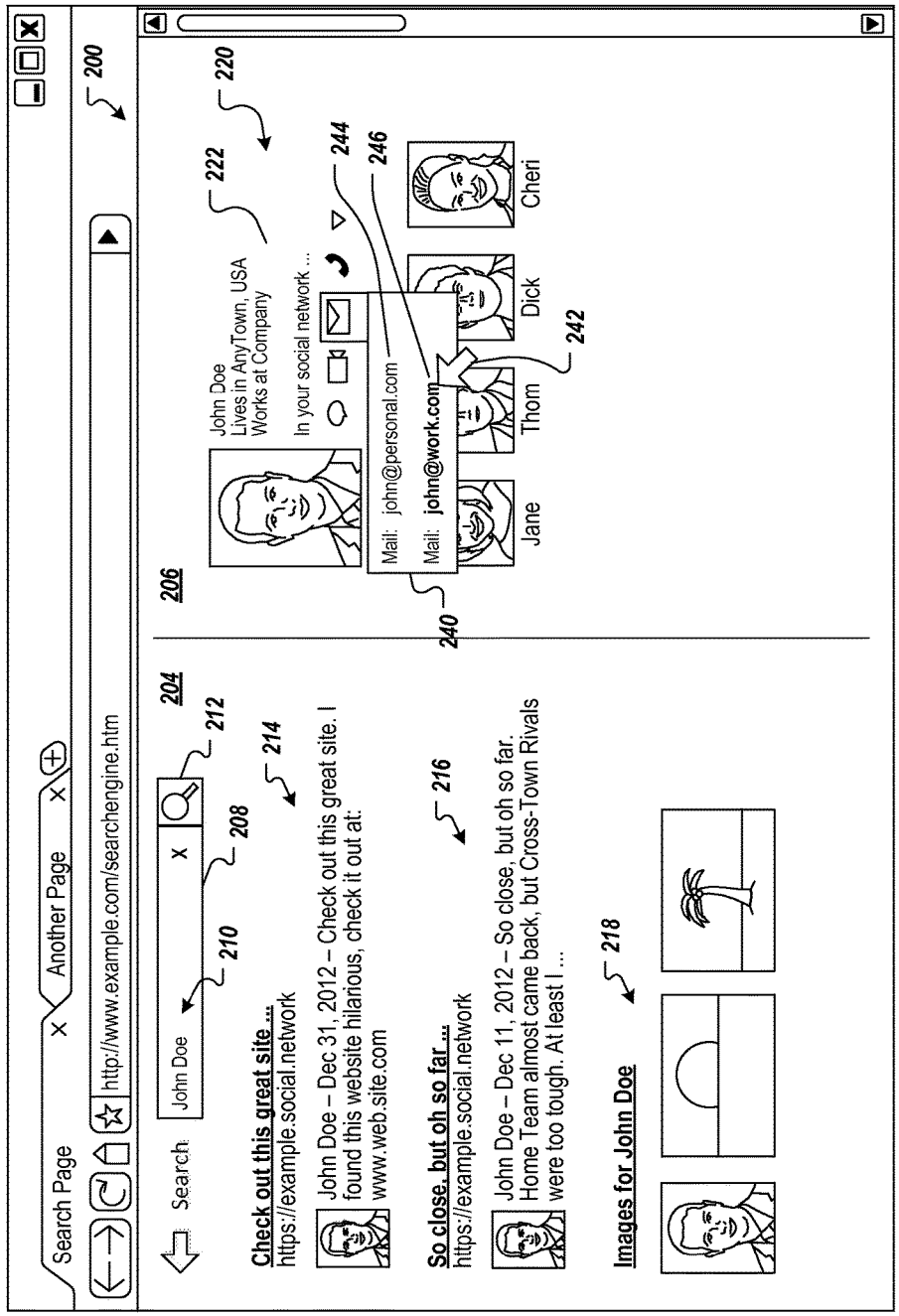
FIG. 2B depicts the example search results page of FIG. 2A including an interaction channel menu.

FIG. 2B depicts the example search results page 200 of FIG. 2A including an interaction channel menu 240. In some examples, an interaction channel menu can be displayed in response to user interaction with an interaction element. For example, a searching user, e.g., the user that submitted the search query, can use a pointer to click on and/or hover over an interaction element, to prompt display of an interaction channel menu. In the depicted example, the interaction channel menu 240 can be displayed in response to a user clicking on and/or hovering over the interaction element 228 using a pointer 242.

In some implementations, and as discussed in further detail herein, the interaction channel menu can display contact data for the user associated with the profile card, the contact data being specific to the particular interaction channel. In the depicted example, contact data is displayed within the interaction channel menu 240 and includes a first electronic mail address 244 and a second electronic mail address 246. For example, the first electronic mail address 244 can be associated with a private electronic mail account and the second electronic mail address 246 can be associated with a work electronic mail account of the user "John Doe."

In accordance with implementations of the present disclosure, an interaction between the searching user and the user represented by a profile card can be initiated directly from the profile card. In some implementations, the interaction can be initiated based on interaction with contact data depicted in an interaction channel menu.

Figure 2C:
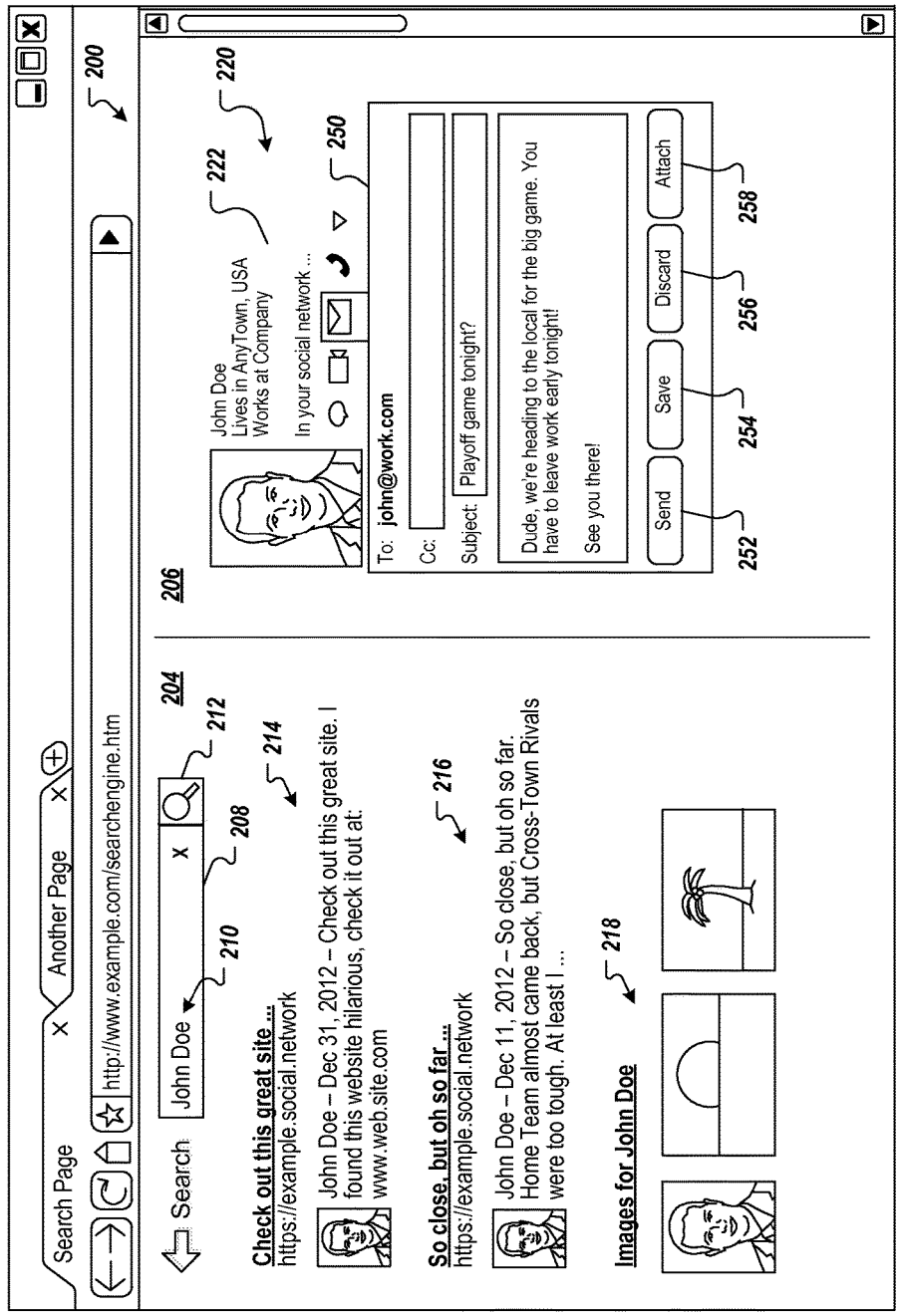
FIG. 2C depicts the example search results page of FIGS. 2A and 2B including an example interaction hovercard.

FIG. 2C depicts the example search results 200 page of FIGS. 2A and 2B including an example interaction hovercard 250. In the depicted example, the interaction hovercard 250 includes an electronic mail to the user "John Doe." In some examples, the interaction hovercard 250 is initiated in response to user interaction with contact data displayed within an interaction channel menu. In the depicted example, the interaction hovercard 250 is initiated in response to user interaction with the second electronic mail address 246 depicted in FIG. 2B. The interaction hovercard 250 includes elements 252, 254, 256, 258. In some examples, the user can click on the element 252 to send the interaction to the user using the second electronic mail address 246.

The progression of FIGS. 2A, 2B and 2C depict advantages of implementations of the present disclosure. For example, the searching user, e.g., who submitted the search query 210, is presented with one or more profile cards, through which contact data can be provided to the searching user. The searching user can directly interact with the contact data, e.g., click on an electronic mail address, to initiate an interaction directly from a search results page. For example, the searching user is able to prepare and send an electronic mail, e.g., the interaction 250, from the search results page 200. In this manner, the searching user is not required to interact with a separate application, e.g., external to the web browser, and/or cut and paste the contact data into a separate application to prepare and send the electronic message.

Figure 3:
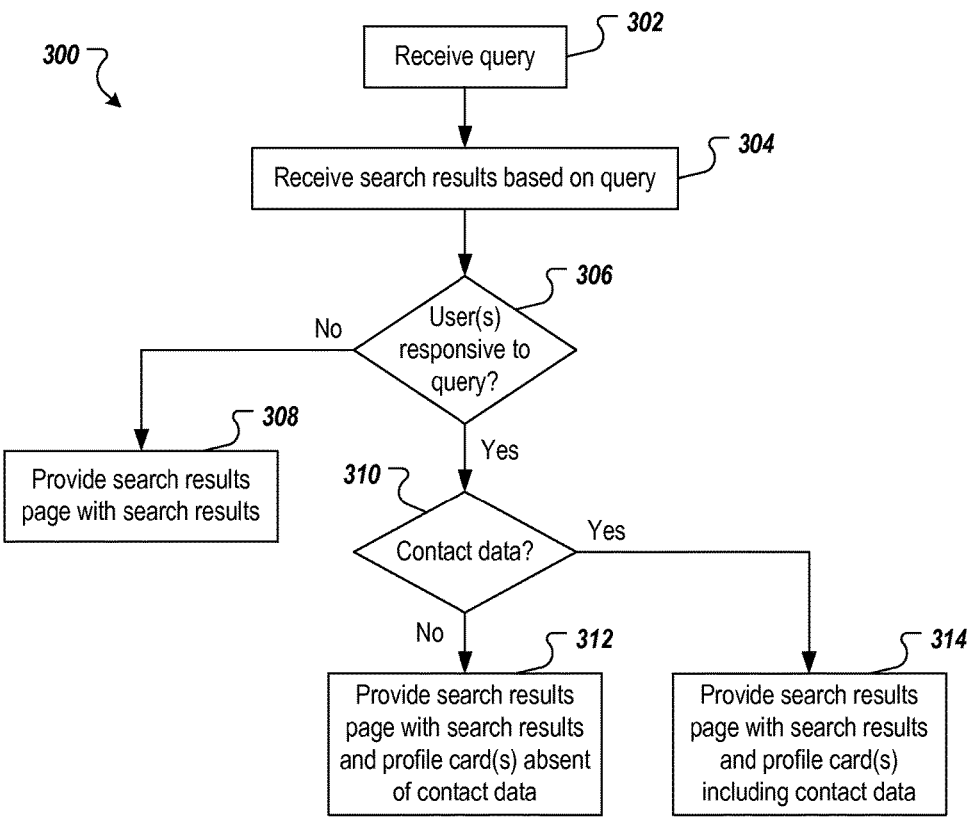
FIG. 3 is a flowchart of an example process for encouraging user interaction from search results.

FIG. 3 is a flowchart of an example process for encouraging user interaction from search results. The example process 300 can be implemented, for example, by the search system 120 in conjunction with the interaction system 130.

A query is received (302). For example, a searching user sends a search query to a search system, e.g., the search system 120 of FIG. 1. Search results responsive to the search query are received (304). For example, the search system 120 receives search results from the search index 122. It is determined whether one or more users are responsive to the query (306). For example, the interaction search system 120 and/or the interaction system 130 can determine whether one or more users are responsive to the query. In some examples, the query can be cross-referenced to information associated with the one or more users, e.g., user name, to determine whether any particular users are responsive to the query. If it is determined that no users are responsive to the query, a search results page including the search results is provided for display (308). For example, the search system 120 can provide a search results page 105 including the search results to a user device 106.

If it is determined that one or more users are responsive to the query, it is determined whether, for each user of the one or more users, contact data is available (310). For example, the search system 120 and/or the interaction system 130 can determine whether, for each user of the one or more users, contact data is available. If contact data is not available for any of the one or more users, a search results page can be provided with the search results and with one or more profile cards, the profile cards being absent of contact data (312). For example, the search system 120 can provide the search results page 105. If contact data is available for at least one user of the one or more users, a search results page can be provided with the search results and with one or more respective profile cards, the profile cards including contact data (314). For example, the search system 120 can provide the search results page 105.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by one or more processors, a search query from a searching user;
identifying, by the one or more processors and using a resource index, a plurality of search results that are responsive to the search query, each of the search results in the plurality of search results being representative of a web resource;
determining, by the one or more processors, whether there are users responsive to the search query using an interaction system that retrieves, from one or more data sources that are distinct from the resource index, contact information that is included in a user profile of the searching user, wherein determining whether there are users responsive to the search query includes cross-referencing the search query to the contact information that is included in the user profile of the searching user;
in response to determining that there are no users responsive to the search query, providing one or more search results of the plurality of search results to a computing device associated with the searching user;
in response to determining that there are users responsive to the search query:
providing, by the one or more processors, a sub-set of the users, each user in the sub-set being connected to the searching user through one or more computer-implemented services, the sub-set comprising at least one user;
determining that contact data of the at least one user is available, wherein the contact data comprises publically available contact data, and wherein determining that contact data is available comprises determining that a portion of the contact data is accessible to the searching user based on privacy settings provided by the user, the portion of the contact data being included in the contact data in response to determining that a portion of the contact data is accessible to the searching user, and in response to determining that contact data of the at least one user is available:
providing an electronic document comprising instructions that, when executed by a computing device, cause the computing device to display a search results page, wherein the search results page comprises a first portion including a group of search results each representative of a web resource responsive to the search query and a second portion including a profile card associated with the at least one user, the profile card comprising one or more graphical representations associated with an interaction channel, each interaction channel being associated with respective contact data of the contact data, and each graphical representation receiving user input and initiating execution of a respective interaction between the searching user and the at least one user from the search results page, an interaction interface that executes the respective interaction being displayed concurrently with the plurality of search results in the search results page, wherein the interaction interface is provided by an interaction hovercard displayed with the search results page in response to initiating execution of an interaction from the search results page; and
transmitting, by the one or more processors, the electronic document to the computing device associated with the searching user.

2. The method of claim 1, wherein the contact data comprises one or more of an electronic message address, a chat identification, a video identification and a telephone number.

3. The method of claim 1, wherein the one or more data sources comprise at least one of a contact data repository associated with a computer-implemented contact management service, a social data repository associated with a computer-implemented social networking service, an electronic mail address repository associated with a computer-implemented electronic mail service, and a public data repository.

4. The method of claim 1, wherein interactions comprise a telephone call, an electronic mail, a chat session and a video conference.

5. A system comprising:
one or more data sources storing contact data; and
one or more processors configured to interact with the one or more data sources, the one or more processors being further configured to perform operations comprising:
receiving a search query from a searching user;
identifying, by the one or more processors and using a resource index, a plurality of search results that are responsive to the search query, each of the search results in the plurality of search results being representative of a web resource;
determining, by the one or more processors, whether there are users responsive to the search query using an interaction system that retrieves, from one or more data sources that are distinct from the resource index, contact information that is included in a user profile of the searching user, wherein determining whether there are users responsive to the search query includes cross-referencing the search query to the contact information that is included in the user profile of the searching user;
in response to determining that there are no users responsive to the search query, providing one or more search results of the plurality of search results to a computing device associated with the searching user;
in response to determining that there are users responsive to the search query:
providing, by the one or more processors, a sub-set of the users, each user in the sub-set being connected to the searching user through one or more computer-implemented services, the sub-set comprising at least one user;
determining that contact data of the at least one user is available, wherein the contact data comprises publically available contact data, and wherein determining that contact data is available comprises determining that a portion of the contact data is accessible to the searching user based on privacy settings provided by the user, the portion of the contact data being included in the contact data in response to determining that a portion of the contact data is accessible to the searching user, and in response to determining that contact data of the at least one user is available:
providing an electronic document comprising instructions that, when executed by the computing device, cause the computing device to display a search results page, wherein the search results page comprises a first portion including a group of search results each representative of a web resource responsive to the search query and a second portion including a profile card associated with the at least one user, the profile card comprising one or more graphical representations associated with an interaction channel, each interaction channel being associated with respective contact data of the contact data, and each graphical representation receiving user input and initiating execution of a respective interaction between the searching user and the at least one user from the search results page, an interaction interface that executes the respective interaction being displayed concurrently with the plurality of search results in the search results page, wherein the interaction interface is provided by an interaction hovercard displayed with the search results page in response to initiating execution of an interaction from the search results page; and transmitting the electronic document to the computing device associated with the searching user.

6. The system of claim 5, wherein the contact data comprises one or more of an electronic message address, a chat identification, a video identification and a telephone number.

7. The system of claim 5, wherein the one or more data sources comprise at least one of a contact data repository associated with a computer-implemented contact management service, a social data repository associated with a computer-implemented social networking service, an electronic mail address repository associated with a computer-implemented electronic mail service, and a public data repository.

8. The system of claim 5, wherein interactions comprise a telephone call, an electronic mail, a chat session and a video conference.

9. A non-transitory computer readable medium storing instructions that, when executed by one or more processors, cause the one or more processors to perform operations comprising:

receiving, by the one or more processors, a search query from a searching user;

identifying, by the one or more processors and using a resource index, a plurality of search results that are responsive to the search query, each of the search results in the plurality of search results being representative of a web resource;

determining, by the one or more processors, whether there are users responsive to the search query using an interaction system that retrieves, from one or more data sources that are distinct from the resource index, contact information that is included in a user profile of the searching user, wherein determining whether there are users responsive to the search query includes cross-referencing the search query to the contact information that is included in the user profile of the searching user;

in response to determining that there are no users responsive to the search query, providing one or more search results of the plurality of search results to a computing device associated with the searching user;

in response to determining that there are users responsive to the search query:

providing, by the one or more processors, a sub-set of the users, each user in the sub-set being connected to the searching user through one or more computer-implemented services, the sub-set comprising at least one user;

determining that contact data of the at least one user is available, wherein the contact data comprises publically available contact data, and wherein determining that contact data is available comprises determining that a portion of the contact data is accessible to the searching user based on privacy settings provided by the user, the portion of the contact data being included in the contact data in response to determining that a portion of the contact data is accessible to the searching user, and in response to determining that contact data of the at least one user is available:

providing an electronic document comprising instructions that, when executed by a computing device, cause the computing device to display a search results page, wherein the search results page comprises a first portion including a group of search results each representative of a web resource responsive to the search query and a second portion including a profile card associated with the at least one user, the profile card comprising one or more graphical representations associated with an interaction channel, each interaction channel being associated with respective contact data of the contact data, and each graphical representation receiving user input and initiating execution of a respective interaction between the searching user and the at least one user from the search results page, an interaction interface that executes the respective interaction being displayed concurrently with the plurality of search results in the search results page, wherein the interaction interface is provided by an interaction hovercard displayed with the search results page in response to initiating execution of an interaction from the search results page; and transmitting the electronic document to the computing device associated with the searching user.

10. The non-transitory computer readable medium of claim 9, wherein the contact data comprises one or more of an electronic message address, a chat identification, a video identification and a telephone number.

11. The non-transitory computer readable medium of claim 9, wherein the one or more data sources comprise at least one of a contact data repository associated with a computer-implemented contact management service, a social data repository associated with a computer-implemented social networking service, an electronic mail address repository associated with a computer-implemented electronic mail service, and a public data repository.

12. The non-transitory computer readable medium of claim 9, wherein interactions comprise a telephone call, an electronic mail, a chat session and a video conference.

13. The method of claim 1, wherein the collection of user information includes user names.

* * * * *

UNITED STATES PATENT AND TRADEMARK OFFICE
CERTIFICATE OF CORRECTION

PATENT NO.        : 10,061,851 B1
APPLICATION NO.   : 13/795028
DATED             : August 28, 2018
INVENTOR(S)       : Su et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 126 days.

Signed and Sealed this
Fourteenth Day of May, 2019

Andrei Iancu
*Director of the United States Patent and Trademark Office*